May 8, 1945. W. G. NOACK 2,375,436
SLAG REMOVING DEVICE FOR FURNACES
Filed Oct. 30, 1943
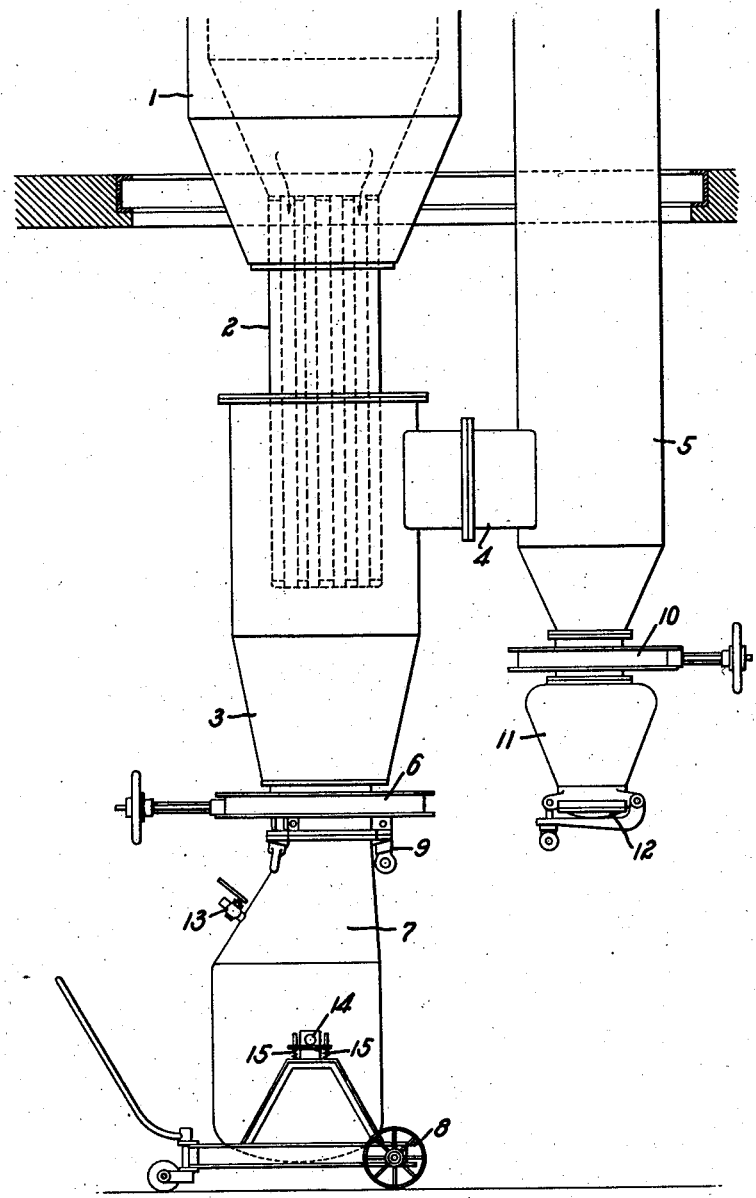

Patented May 8, 1945

2,375,436

UNITED STATES PATENT OFFICE 2,375,436

SLAG REMOVING DEVICE FOR FURNACES

Walter Gustav Noack, Baden, Switzerland, assignor to Aktiengesellschaft Brown, Boveri & Cie, Baden, Switzerland Application October 30, 1943, Serial No. 508,427
In Switzerland November 19, 1942

5 Claims. (Cl. 110—165)

With pressure fired furnaces, that is where the firing occurs at a pressure greater than 0.2 atmosphere above that of the surrounding atmosphere, it is impossible to remove the slag from the combustion chamber without special sluicing devices. It is known to connect a large container to the combustion chamber into which during operation the slag falls or flows and from which during an interruption in service it can be removed. In order not to be dependent on service interruptions it has also been proposed to provide a stop valve in front of the container so as to be able to shut off this latter from the combustion chamber when it is desired to empty it. The slag is then emptied into an ordinary slag waggon.

According to the present invention these devices are simplified by constructing the containers for removing the slag so as to be pressure tight and by subjecting them to the pressure of the combustion chamber whilst they are being filled. The slag flows or falls directly into the container or slag waggon by means of which it is removed.

The accompanying drawing illustrates how such a device can for instance be employed in connection with a coal-dust fired Velox steam generator. In the figure 1 indicates the combustion chamber, 2 the evaporator and 3 the slag separator to which the conduit 4 leading to the superheater 5 is connected. The heating gases which flow with a high velocity through the heating tubes of the evaporator 2 carry the slag particles in a molten state along with them, these particles coming in contact with the cold walls whereupon they become hardened and granulated so that they are separated out in the form of dust in the lower part of the slag separator. The particles which are thus flung out fall through the open valve 6 into the container 7 of the slag waggon 8. Container 7 is pressure tight and connected by means of the easily removable flange connection 9 in a gas-tight manner with the slag separator. When the container is filled it can be wheeled directly to the slag tip and emptied there.

Slag which is carried along by the heating gases and falls down in the superheater 5 can be caught in a further pressure-tight vessel 11 which is provided with a sluice valve 10. Since the quantities of slag which have to be dealt with here are generally very small, it is not necessary to provide special transporting devices. It is sufficient to empty the contents into the slag waggon 7, 8 which can be placed underneath the open cover 12.

Before the slag waggon is moved away from the slag separator and after valve 6 has been closed, valve 13 is opened so as to allow the pressure to escape from the container. Due to the weight of the slag the container 7 moves down on to a stop on bearing 14. When the container is empty it is raised by the springs 15 to such an extent that the upper edge of its flange just comes in contact with the lower edge of the valve flange.

Due to the very high gas velocities and the quenching effect to which the slag particles are subjected when they flow past the heating surfaces it is impossible for slag nests to form, any slag deposits on the few impact surfaces such as the upper end surface of the evaporator being readily removed automatically by mechanical means, so that with the exception of the very fine slag dust which remains suspended in the heating gases, all slag passes into the slag waggon. The problem of removing and transporting away the slag, which with pulverized-coal firing is a very complicated matter, is thus very considerably simplified.

I claim:

1. Apparatus for removing slag from a pressure fired furnace, said furnace having a slag separator, a slag discharge opening and a valve adapted to close said opening, said apparatus comprising a portable container having a slag inlet and being otherwise gas tight, and means providing a separable gas tight connection between said slag discharge opening and said slag inlet.

2. Apparatus as defined in claim 1 in which the container is provided with a valve for releasing gas therefrom.

3. Apparatus as defined in claim 1 in which the portable container is supported by a carriage adapted to be moved on a fixed floor beneath said discharge opening, and flexible means supporting said container on said carriage, said flexible means being responsive to the load in the container to support the same when empty at such an elevation that the inlet opening thereof may be hermetically connected to the slag discharge opening and to support the same when loaded in a lowered position in which said connection may be broken and the container moved laterally with its carriage relative to said discharge opening.

4. Apparatus for removing slag from a pressure fired furnace, said furnace having a slag separator, a slag discharge opening and a valve controlling said opening, said apparatus comprising a floor, a carriage supported by and movable on said floor, and a slag container supported on said carriage, said container having a slag inlet adapted to be connected to said slag discharge opening by a gas tight joint, and means for raising the container when empty to an elevation permitting the connection and for lowering the container when full to permit breaking said connection and movement of the container laterally with respect to said slag discharge opening.

5. Apparatus as defined in claim 4 in which said means for raising and lowering the container consists of a flexible pressure sensitive connection between the container and the carriage.

WALTER GUSTAV NOACK.